No. 659,949. Patented Oct. 16, 1900.
C. W. ARRASMITH.
RECEPTACLE FOR PACKING FRUIT.
(Application filed June 14, 1900.)
(No Model.)
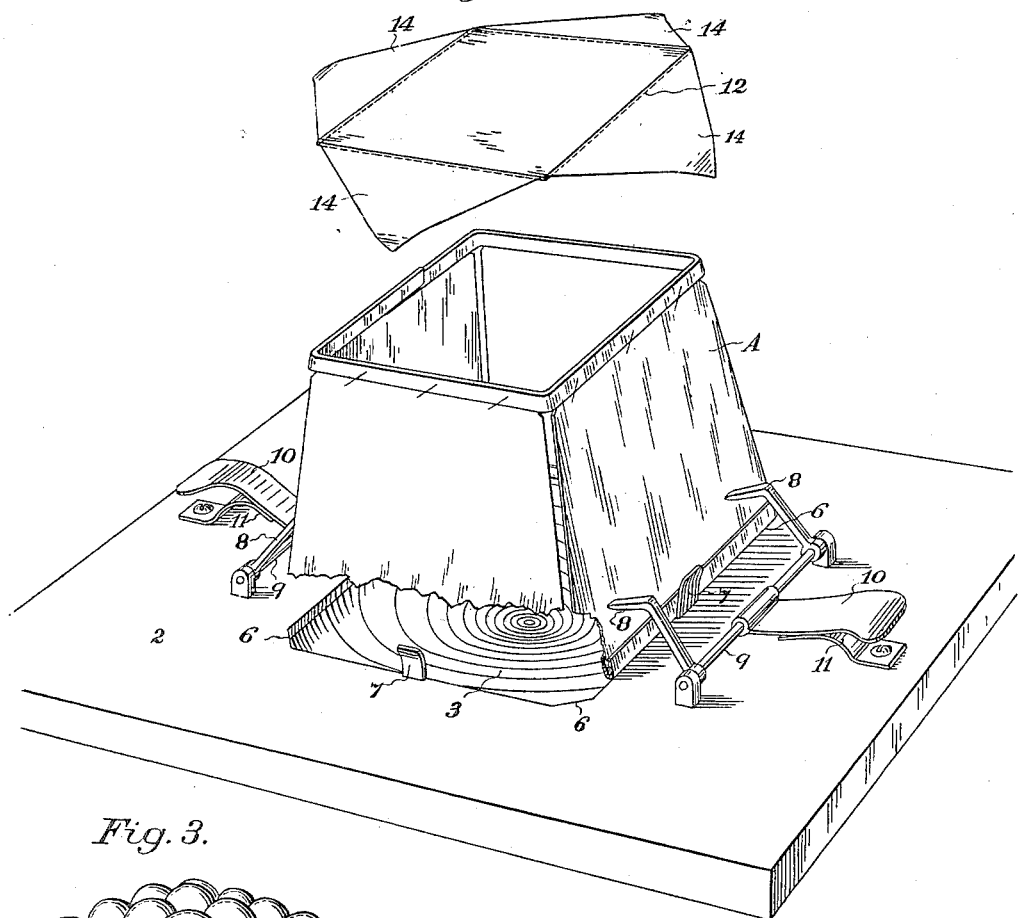
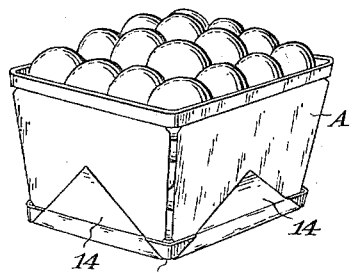
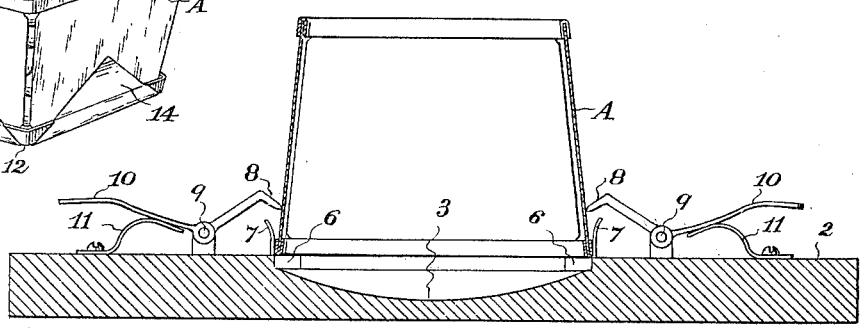
Witnesses,
E. A. Branday
Inventor,
Charles W. Arrasmith
By Dewey Strong & Co.
Attys

UNITED STATES PATENT OFFICE.

CHARLES W. ARRASMITH, OF COURTLAND, CALIFORNIA.

RECEPTACLE FOR PACKING FRUIT.

SPECIFICATION forming part of Letters Patent No. 659,949, dated October 16, 1900.

Application filed June 14, 1900. Serial No. 20,224. (No model.)

*To all whom it may concern:*

Be it known that I, CHARLES W. ARRASMITH, a citizen of the United States, residing at Courtland, county of Sacramento, State of California, have invented an Improvement in Devices for Packing Fruit; and I hereby declare the following to be a full, clear, and exact description of the same.

My invention relates to that class of devices which are used mostly for packing fresh fruit—such as cherries, berries, &c.—for shipping a considerable distance; and it consists of a base-board with a suitable clamping device for holding the basket or other receptacle adapted to contain the fruit.

It also comprises details of construction which will be more fully explained by reference to the accompanying drawings, in which—

Figure 1 is a general view of the apparatus. Fig. 2 is a longitudinal section through the center of the base-board. Fig. 3 shows the basket when ready for the market.

A may be any kind of a basket or other receptacle such as used for the shipping of this kind of fruit. As here shown, the basket without a bottom is put bottom side up upon a base-board 2. This board has a depression 3 in its center. This depression 3 may be of any shape—square, round, or oblong—to suit the shape of the particular basket which is used. In this case, as here illustrated, the basket A is of a square form and the depression is made to correspond. The base of this depression is made concaved, while the sides are made vertical. By this construction the packer is enabled to put what is termed a "crown" upon his basket, as shown in Fig. 3. The corners of this depression 3 are not cut out, but there is a little space 6 left to let the corners of the basket rest upon it and prevent the latter from dropping into the depression 3. Around the edges of the depression are also guide-plates 7 to guide the basket A to its proper place. Upon opposite sides of the depression 3 are situated clamps 8. These clamps are hook-shaped and mounted upon a rock-shaft 9, the latter carrying also plates 10, which serve as handles to be pressed down in order to hold the basket in its place and again to release the same when filled. Below these handle-plates 10 are flat springs 11 to force the plates 10 upward, and consequently the clamp 8 against the basket. Now when the basket is thus filled any suitable bottom may then be attached to the basket. As here shown and which I deem the most economical, I use a piece of pasteboard 12, cut exactly to the size of the bottom of the basket, and this bottom 12 is put upon another piece of paper diagonally, so as to form lapels 14 on the sides of the bottom 12. These lapels 14 are moistened with any kind of paste and smoothed down the sides of the basket A to hold the bottom rigidly in its place. The base-board, with the filled basket clamped to it, is then turned upside down, so that the basket will stand on its bottom, and by releasing the clamps the board is then taken away and the basket is ready for shipment. By this method I am enabled to do quick work and at the same time give the article a neat and inviting appearance by forming a nice crown to the basket.

Having thus described my invention, what I claim as new, and desire to secure by Letters Patent, is—

1. In a device for packing fruit, a base-board having a depression, the bottom of said depression being concaved with vertical sides having also projecting corners to permit a receptacle to rest upon it, and spring-pressed clamps on opposite sides of the depression to retain the receptacle in position.

2. In a device for packing fruit, a base-board having a depression, and clamps upon opposite sides of the depression, and consisting of hook-shaped arms, a rock-shaft upon which the arms are mounted, and spring-pressed handle-pieces fixed to the shaft and operating the clamps.

3. A device for packing fruit comprising a base with a concavity substantially corresponding with the shape of the basket, and having supports upon which the inverted basket rests, guides, and spring-pressed clamps for holding the basket while being filled.

4. In a device for packing fruit, the combination with a base-board having a depression adapted to receive the open end of a receptacle, of means including a rock-shaft having devices to engage and hold the basket while being filled.

In witness whereof I have hereunto set my hand.

CHARLES W. ARRASMITH.

Witnesses:
S. H. NOURSE,
JESSIE C. BRODIE.